United States Patent

Huemer et al.

[11] Patent Number: 6,000,421
[45] Date of Patent: Dec. 14, 1999

[54] VALVE DEVICE FOR A HEAT EXCHANGER LOCATED IN A BYPASS IN A COOLING CIRCUIT, ESPECIALLY OF AN INTERNAL COMBUSTION ENGINE

[75] Inventors: Gerhart Huemer, Munich; Heinz Lemberger, Unterfoehring; Henning Bode, Einbeck, all of Germany

[73] Assignees: Bayerische Motoren Werke Aktiengesellschaft, Munich; Kayser Automotive Systems, Einbeck, both of Germany

[21] Appl. No.: 09/262,302

[22] Filed: Mar. 4, 1999

Related U.S. Application Data

[63] Continuation of application No. PCT/EP98/03852, Jun. 24, 1998.

[30] Foreign Application Priority Data

Jul. 4, 1997 [DE] Germany .......................... 197 28 722

[51] Int. Cl.⁶ .................................................... G05D 7/01
[52] U.S. Cl. ...................... 137/110; 137/460; 137/512.2; 137/599.1; 123/41.1
[58] Field of Search ................................ 137/512.2, 460, 137/599.1, 110; 123/41.1

[56] References Cited

U.S. PATENT DOCUMENTS

| | | | |
|---|---|---|---|
| 2,357,321 | 9/1944 | Fuller | 137/460 |
| 2,509,504 | 5/1950 | Jensen et al. | 137/144 |
| 2,960,996 | 11/1960 | Haselton | 137/512.2 |
| 4,800,925 | 1/1989 | Yeoman | 138/46 |
| 4,874,010 | 10/1989 | DeJong et al. | 137/110 |
| 5,271,559 | 12/1993 | Naujock | 237/12.3 B |
| 5,357,998 | 10/1994 | Abrams | 137/68.1 |
| 5,564,458 | 10/1996 | Roth et al. | 137/599.1 |
| 5,566,881 | 10/1996 | Inoue et al. | 137/599.1 |
| 5,762,266 | 6/1998 | Okumura et al. | 237/12.3 B |

FOREIGN PATENT DOCUMENTS

| | | |
|---|---|---|
| 0 174 800 | 3/1986 | European Pat. Off. . |
| 0 302 264 | 2/1989 | European Pat. Off. . |
| 2 666 136 | 2/1992 | France . |
| 1 172 918 | 11/1962 | Germany . |
| 2 231 782 | 2/1973 | Germany . |
| 37 15 003 | 11/1988 | Germany . |
| 196 27 655 | 1/1997 | Germany . |

*Primary Examiner*—Stephen M. Hepperle
*Attorney, Agent, or Firm*—Evenson McKeown Edwards & Lenahan PLLC

[57] ABSTRACT

A cooling circuit includes a valve device (1, 1', 1") for a separate heat exchanger (42), especially of an internal combustion engine (48). To achieve a combined pressure limitation and pipe or hose break valve, a valve body (6, 35, 50), upon reaching a coolant throughput for maximum heat transfer in heat exchangers (42) located downstream, is actuated as a function of delivery pressure into an engaged position with a valve seat (5, 51). A throttle passage (7, 36, 52) maintains a coolant throughput that corresponds to maximum heat transfer. In the event of a pipe or hose break, the valve body (6, 35, 50) serving as part of a pipe or hose break is locked in a closed position.

16 Claims, 5 Drawing Sheets

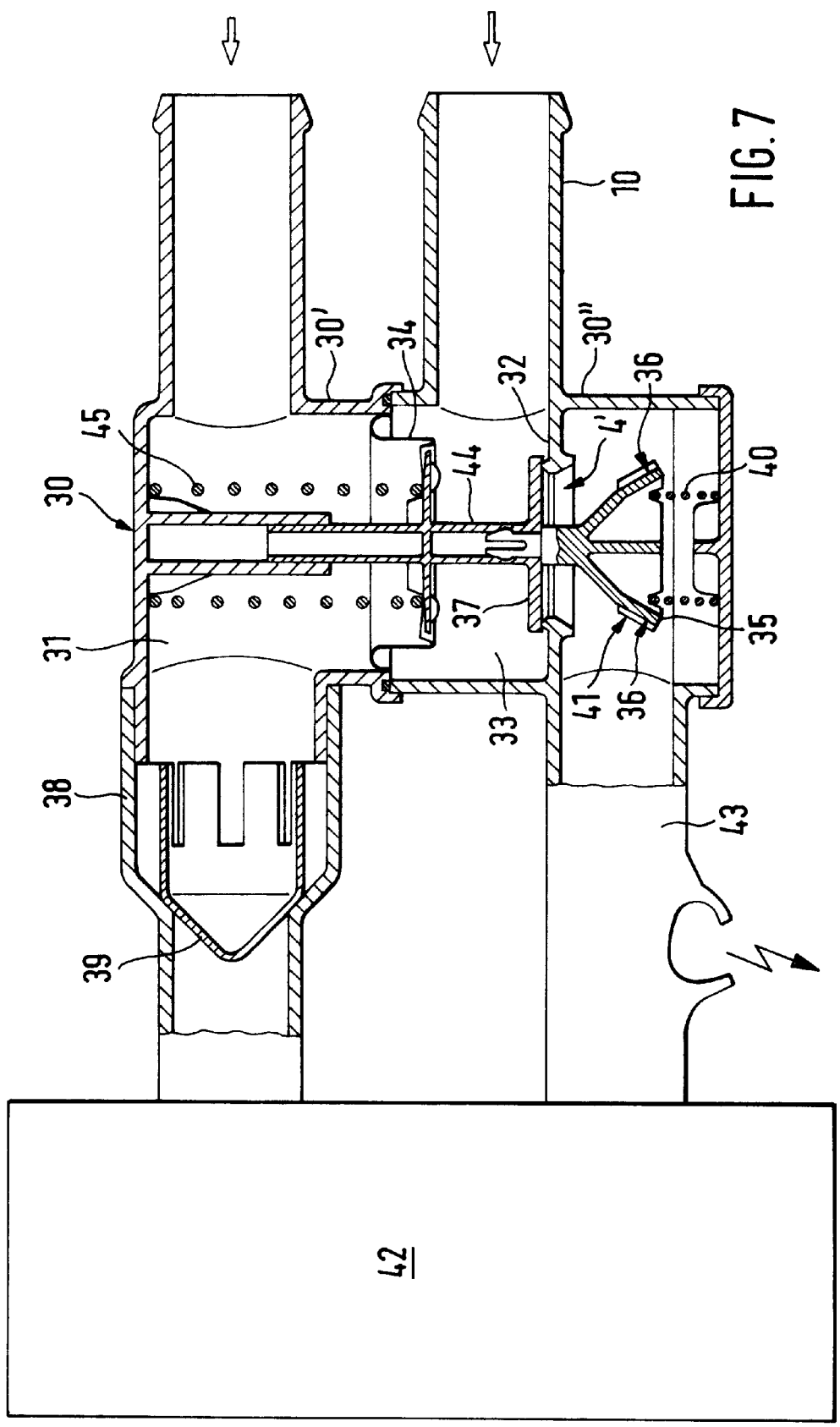

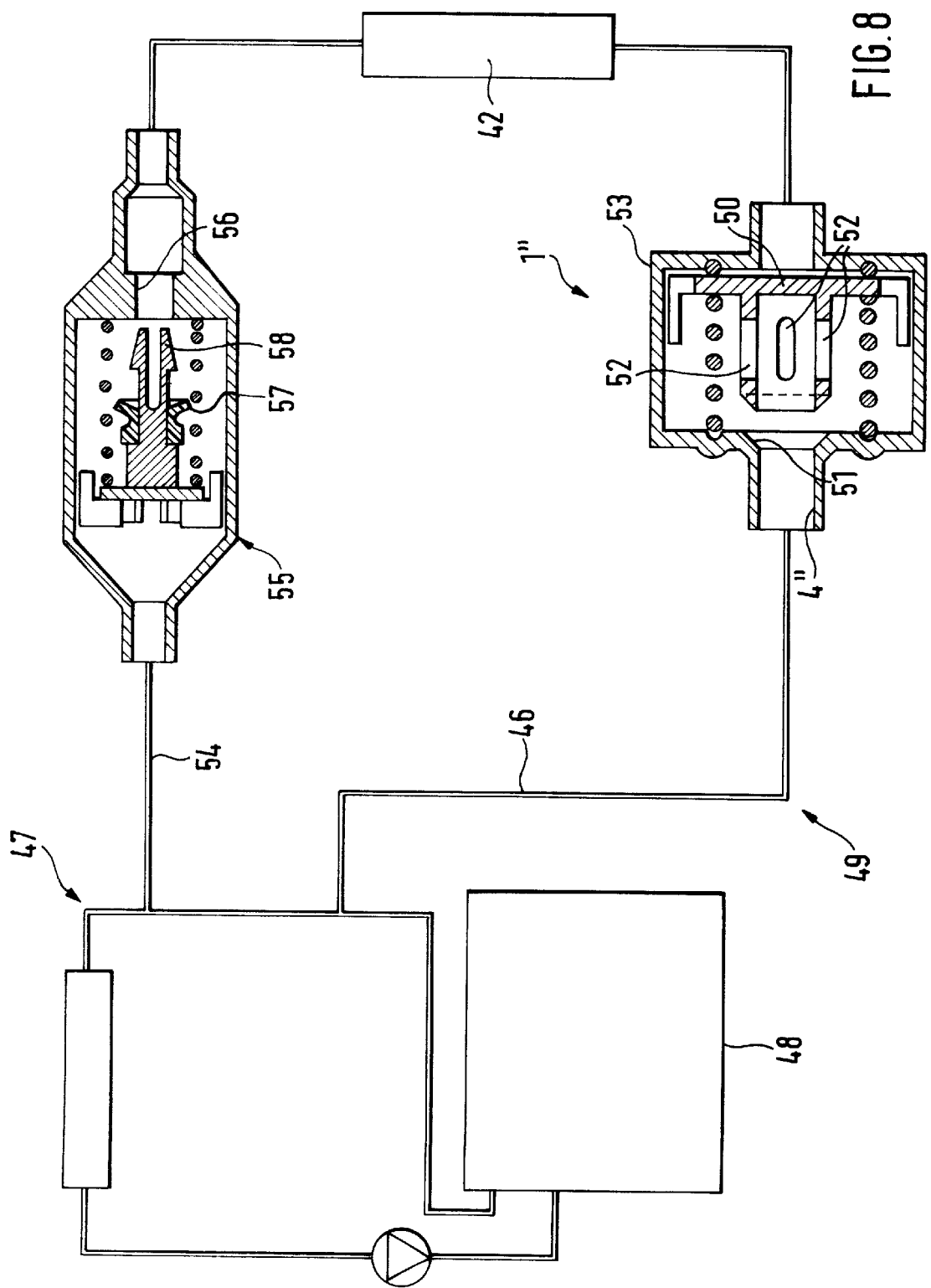

VALVE DEVICE FOR A HEAT EXCHANGER LOCATED IN A BYPASS IN A COOLING CIRCUIT, ESPECIALLY OF AN INTERNAL COMBUSTION ENGINE

CROSS-REFERENCE TO RELATED APPLICATIONS

This application is a continuation under 35 U.S.C. 111(a) of pending international PCT Application No. PCT/EP98/03852, filed Jun. 24, 1998, and claims the priority of German application number 197 28 722.0, filed on Jul. 4, 1997, the disclosures of which are incorporated by reference herein.

BACKGROUND AND SUMMARY OF THE INVENTION

The invention relates to a valve device for a heat exchanger located in a bypass in a cooling circuit, especially of an internal combustion engine. A valve body actuated as a function of delivery pressure against the resistance of a return spring relative to a valve seat to limit a line cross section, as well as a throttle passage serving for a predetermined coolant throughput are located in a housing of the valve device for through-flow-regulated pressure limitation.

A valve device of the type generally described above is known for example from German patent document DE 196 27 655 A, which is used for a heating device for a vehicle. The valve device is located in a bypass for heat exchangers to keep the feed pressure of the hot water at a constant level in each heat exchanger. In addition, the valve body used in the valve device has a throttle passage for the purpose of maintaining a hot water circulation in the bypass when the valve body is closed.

Another valve device of the type generally described above is known from European patent document EP-A 0 302 264. The subject of this reference is intended to provide maximum heat transfer in the heat exchanger located downstream, especially when the internal combustion engine is at idle. This is accomplished by the fact that the coolant throughput is almost not throttled at all when the engine is at idle. No additional information for higher pump pressures is provided.

The goal of the invention is to improve on the valve device of the type generally described above in such fashion that the feed and delivery pressures are limited when a coolant throughput is reached that produces maximum heat transfer in the heat exchanger with flow continuing through the heat exchanger. A delivery-dependent effective safety device is combined with this through-flow-regulated pressure demand.

This goal is achieved by providing a valve device for a heat exchanger located in a bypass cooling circuit of an internal combustion engine, comprising: a housing communicated with the bypass cooling circuit; a valve seat located in said housing, said valve seat defining a line cross section; a valve body disposed in said housing to be movable between a closed position engaged with said valve seat and an open position spaced from said valve seat, said valve body defining a throttle passage; a return spring arranged to bias said valve body toward said open position; said valve body being moved into said closed position by a delivery pressure of a coolant flow for a maximum heat transfer in the heat exchanger, said throttle passage having a cross-section adapted to said maximum heat transfer, wherein said valve body, in the event of a break in the bypass cooling circuit, serves as part of a break valve that is held in a closed position independently of the delivery pressure via a locking device, with a sealing element that suppresses the coolant flow.

This goal is achieved by providing a valve for a fluid line, comprising: a valve housing; a sliding sleeve slidably disposed in said housing, said sliding sleeve being slidable between an upstream position and a downstream position, said sliding sleeve defining a valve seat; a spring arranged between said sliding sleeve and said valve housing, said spring biasing said sliding sleeve toward said upstream position; a valve body disposed in said sliding sleeve to be movable between an open position and a closed position, said valve body defining a sealing seat which engages said valve seat in said closed position, said valve body defining a throttle passage; a return spring arranged between said valve body and said sliding sleeve, said return spring biasing said valve body toward said open position; a sealing element arranged downstream of said valve body, said sealing element sealing said throttle passage when said valve body is in said closed position and said sliding sleeve is in said downstream position.

In so-called thermomanagement systems with separate heat exchangers for heating and cooling, with the valve device according to the invention the flow through the respective heat exchanger can advantageously be limited continuously as a function of its maximum necessary coolant throughput for optimum heat transfer. With this individual pressure limitation for each individual heat exchanger in the bypass, it is also advantageously ensured that each heat exchanger at most has only the coolant throughput necessary for optimum heat transfer and therefore all of the heat exchangers in the cooling circuit, depending on their design, are supplied with the required maximum quantity of coolant when the valve body that limits the pressure is closed. As a result, the engine itself, especially with heat exchangers connected in parallel in the coolant circuit and additional heat exchangers also included in the circuit, is provided with more coolant for its own heating or cooling. With this pressure limitation set according to the invention for the coolant throughput for maximum heat transfer, with a coolant throughput through the throttle passage that corresponds to the respective throttle characteristic of the heat exchanger in question, in the event of a further increase in coolant throughput in the cooling circuit the heat exchanger is protected against an additional pressure rise and its operating safety is thus increased.

The valve device according to the invention, in addition to the pressure limitation achieved by using through-flow regulation, also serves as a first pipe or hose break valve known of itself for example from German patent document DE-8 1 172 918 whose through flow shutoff function in a motor vehicle with a liquid-cooled engine with heat exchangers included in bypasses in its cooling circuit for various purposes, in the event of a pipe or hose break, cuts off the affected bypass circuit from the rest of the cooling circuit, with the vehicle advantageously continuing to be operable.

In a first embodiment of the invention, the valve device is equipped with a pipe or hose break valve in such fashion that the valve body made with the throttle passage is slidably movably mounted in a sliding sleeve that contains the valve seat. The sleeve is mounted in the housing between the pipe and hose stubs, with the valve body abutting the valve seat essentially tightly as a function of delivery pressure, against a compression spring in tight contact with the housing. With the additional striking movement of the sliding sleeve triggered as a function of the delivery pressure by a tube or hose break, an elastic element in a fixed location downstream in the pipe or hose stub closes the throttle passage.

To maintain the function of a pipe or hose break valve especially when the delivery pressure or coolant throughput is low, it is proposed in another embodiment that when the throttle passage closes, a locking device operates that holds the valve body and the sliding sleeve in a tight closed position.

The improved safety valve according to the invention described above ensures that when a line break takes place downstream from the valve device in the bypass, a further escape or loss of coolant from the cooling circuit that is usually equipped with a circulating pump is avoided in conjunction with a check valve that serves in the bypass return as a pipe or hose break valve. Thus, in particular, a cooling circuit of an engine continues to function with the exception of the heat exchanger cut off by a broken line section.

In an embodiment of a combined pressure-limiting and safety valve designed differently from the valve device described above, it is proposed that in a housing, a diaphragm that separates a return chamber from a divided forward chamber with a partition that has a valve opening is in a driving connection with a valve body that controls the valve opening on the outflow side, with throttle passages and a valve plate that closes the valve opening in the event of a pipe or hose break on the feed side, and that a check valve is located in a return stub of the housing on the heat exchanger side.

A third valve device according to the invention is advantageously designed simply so that the valve body itself, in the event of a line break, serves as a pipe or hose break valve and thus only one separate pipe or hose break valve is necessary in the bypass in the other line.

With the design of the valve device advantageously first described in terms of construction cost and space, to achieve the safety function when a pipe or hose breaks, a corresponding delivery pressure is necessary in the cooling circuit. With the second design of the valve device that is slightly more expensive to build, the safety function is ensured by a closing spring that acts on the diaphragm on the return chamber side.

Other objects, advantages and novel features of the present invention will become apparent from the following detailed description of the invention when considered in conjunction with the accompanying drawings.

BRIEF DESCRIPTION OF THE DRAWINGS

FIG. 7 shows the valve device of FIG. 6 functioning as a safety valve during a pipe or hose break; and FIG. 8 is a cut-away view of another embodiment of a valve device according to the invention in a bypass return.

Referring to FIGS. 1–3, a first embodiment of a valve device 1 for a cooling circuit, not shown but having a separate heat exchanger, of an internal combustion engine, not shown, in a housing 2 includes a valve body 6. The valve body 6 is actuated as a function of delivery pressure against the resistance of a return spring 3 relative to a valve seat 5 that delimits a line cross section 4, as well as a throttle passage 7.

Figure 1:
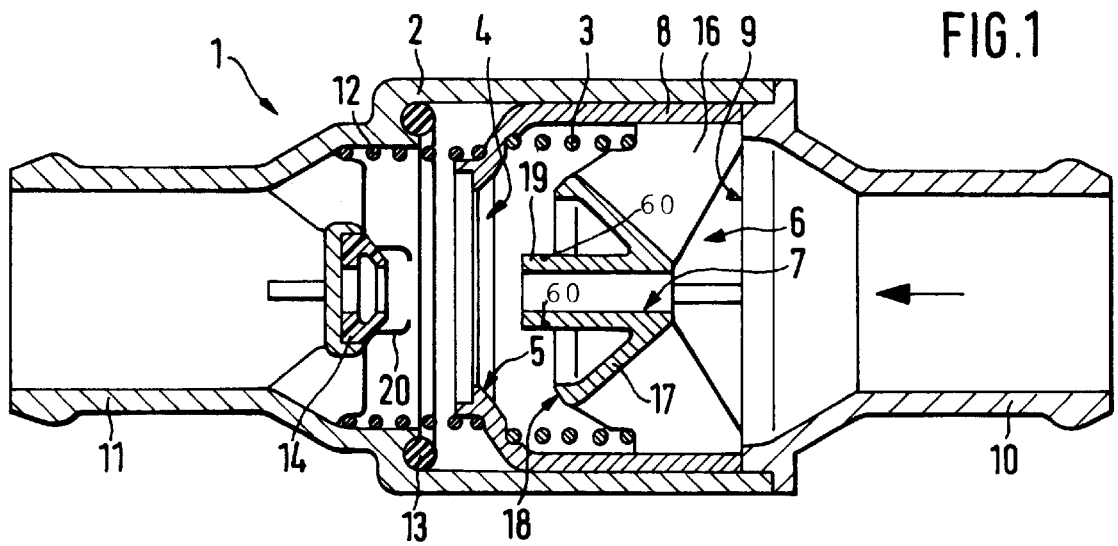
FIGS. 1 to 3 show a cut-away view of a valve device according to a first preferred embodiment of the invention, in three different operative positions.

The value device 1 limits the feed flow or delivery pressure to a value that corresponds to a coolant throughput that is created in the respective heat exchanger when the maximum heat transfer is achieved, while simultaneously maintaining the coolant throughput specified for maximum heat transfer. This is accomplished by actuating the valve body 6 into the closed position with the valve seat 5, shown in FIG. 2, when the coolant throughput is reached for a maximum heat transfer in each heat exchanger located downstream as a function of the delivery pressure. The throttle passage 7 has a cross section 4 through which a coolant throughput that essentially corresponds to the maximum heat transfer is maintained.

Valve device 1 acts as a through-flow regulating valve with controlled pressure limitation for a heat exchanger located downstream whose exposure to the maximum heat transfer is advantageously reduced, in conjunction with an advantageous pressure relief of the heat exchanger with higher operating safety and longer lifetime. In addition, valve device 1 effects a need-oriented division of the coolant flows, with a plurality of heat exchangers in the cooling circuit of the internal combustion engine.

Figure 2:
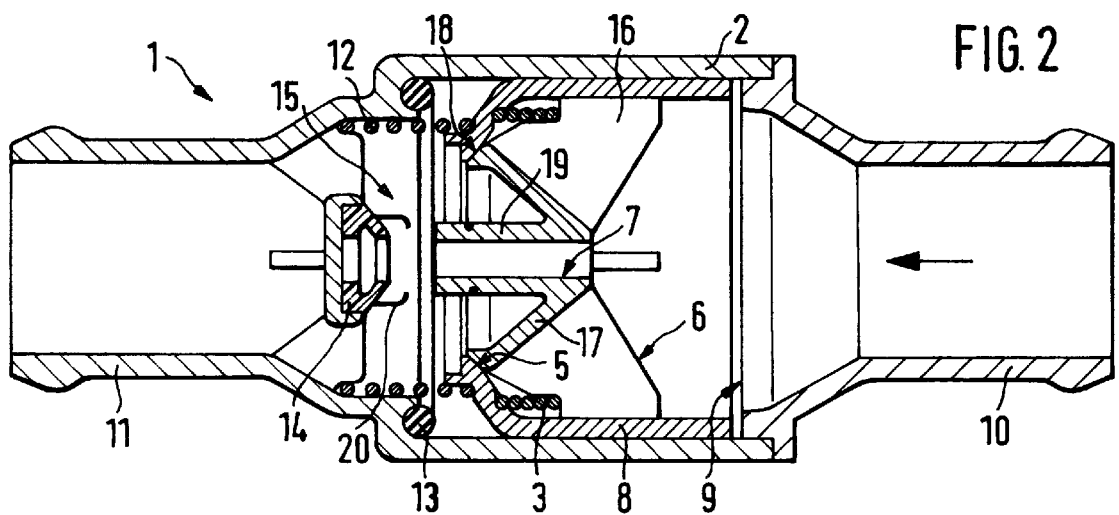
Figure 3:
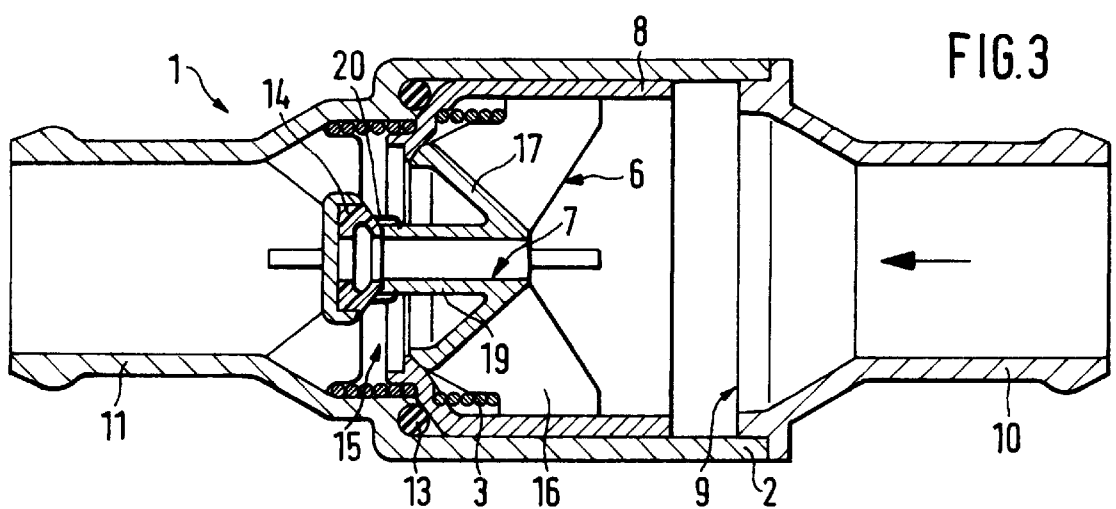

As can also be seen from FIGS. 1 to 3, the valve body 6 formed with throttle passage 7 and serving as part of a pipe or hose break valve is located slidably movably in a sliding sleeve 8 that contains valve seat 5. The sleeve in housing 2 between pipe and hose stubs 10, 11, with valve body tightly abutting essentially against valve seat 5, is brought, as a function of the delivery pressure, against a compression spring 12 and into a tight fit against a sealing ring 13 according to FIG. 3, whereupon with the impact movement of the sliding sleeve 8, an elastic element 14 in a permanent location in the pipe or hose stub 11 seals off throttle passage 7. It is also evident from FIG. 3 that when throttle passage 7 is closed a locking device 15 begins to operate that holds valve body 6 and sliding sleeve 8 in a tight closed position.

Advantageously and in addition, the safety function of a hose or pipe break valve is achieved with the improvement according to the invention on the valve device 1 that serves to limit pressure. In the event of damage to a connecting line in the bypass downstream of valve device 1 to a heat exchanger, further supply of coolant to this heat exchanger is suppressed, with further loss of coolant from the cooling circuit being avoided by the intact bypass return by means of an additional pipe or hose break valve, which in a structurally simple fashion is preferably designed as a check valve as shown for example by check valve 39 of valve device 1' in FIGS. 6 and 7. With the valve device 1 which in this case acts as a hose or pipe break valve, drainage of the cooling circuit is prevented so that the coolant circuit with the other heat exchangers properly connected including the engine, remains fully functional. In addition, this valve device 1 ensures that depending on the arrangement of a defective heat exchanger or a defective connecting line, only the content of this heat exchanger can spread into the interior of the vehicle.

As is also evident from FIGS. 1 to 3, the valve body 6 that can be adjusted as a function of delivery pressure for through-flow regulation, for regulating the coolant throughput in a heat exchanger connected downstream, has a sealing body 17 with a sealing seat 18. The body is conical on the inflow side and is guided slidably movably in sliding sleeve 8 by wings 16 distributed over it. The throttle passage 7, with its throttle characteristic adjusted to the throttle curve of the heat exchanger connected downstream, is located in an extension 19 provided on the downstream side and projecting beyond valve seat 5 in the closed position of valve body 6 and sliding sleeve 8. The projection is provided with latching locations 60 for latching tongues 20 of locking device 15. Locking device 15 ensures that valve device 1 is held with a perfect seal in the cooling circuit even when the delivery pressure is low or fluctuates sharply.

Figure 4:
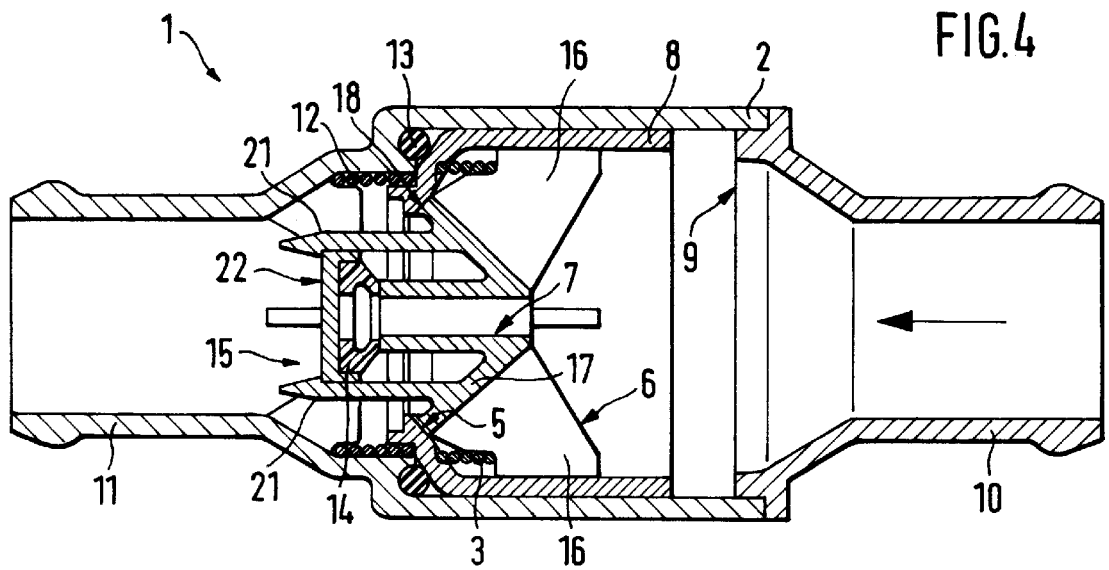
FIG. 4 is a cut-away view of another valve device in which the locking device has been modified.

A first modification of the valve device 1 that regulates the coolant throughput or the coolant through flow for an adjacent heat exchanger is shown in FIG. 4, with identical parts being given identical reference numbers. The valve device 1 shown in FIG. 4 which functions as a safety valve with total blockage of the coolant inflow to the adjacent heat exchanger differs from the valve device 1 in FIGS. 1 to 3 by a modified locking device 15. The locking device 15 includes elastic latching loops 21 located on valve body 6. The loops 21 cooperate with a supporting plate 22 that supports the sealing element 14 in the pipe or hose stub 11 on the downstream side to hold valve body 6 and sliding sleeve 8.

Figure 5:
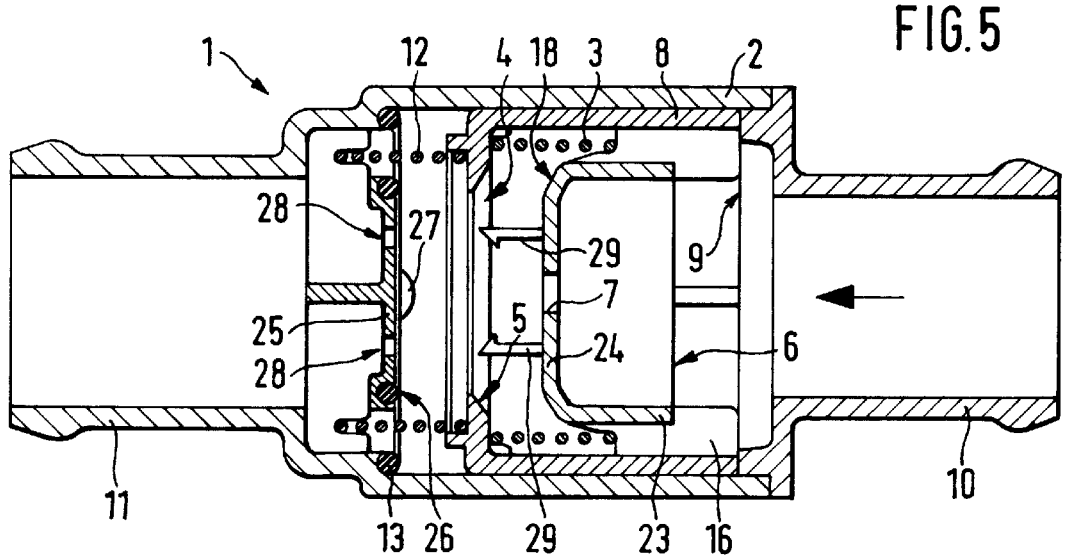
FIG. 5 is a cut-away view of another embodiment of a valve device having a simplified design.

In the second modification of valve device 1 shown in FIG. 5 the identical parts have again been given identical reference numbers. In this valve device 1, valve body 6 has a sealing body 23 in the shape of a pot on the inflow side and guided slidably movably by wings 16 located distributed over it in sliding sleeve 8. A throttle passage 7 is located in bottom 24, with which a sealing element 27 that projects on a plate 25 on the downstream side is associated by a sealing ring 26 impacted by sliding sleeve. Plate 25 is also provided with openings 28 to allow latching hooks 29 located on valve body 6 to pass through.

Each of the locking devices 15 shown in FIGS. 1 to 5 is designed so that valve body 6 and sliding sleeve 8, when repair is necessary for a defective connecting line between valve body 1 and the associated heat exchanger, can easily be released by hand.

Figure 6:
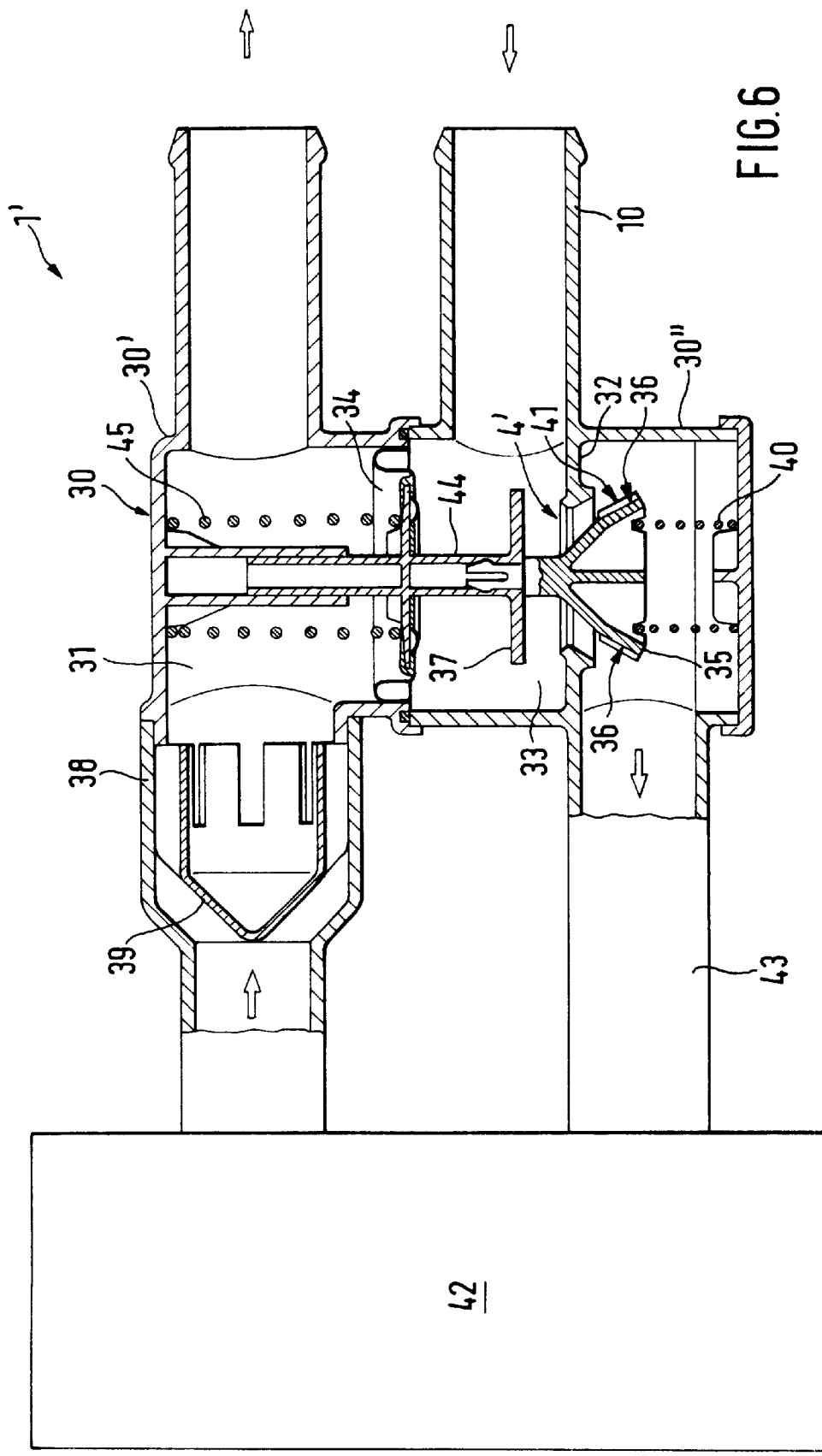
FIG. 6 is a cut-away view of another embodiment of a valve device according to the invention with a valve body that can be controlled by a diaphragm, shown in operation.

The valve device 1' shown in FIGS. 6 and 7 combine the functions of a pressure limitation produced by through flow regulation and a safety valve in the event of a hose or pipe break. The valve device 1' includes a housing 30 with a return chamber 31 that is separated by a diaphragm 34 from a feed chamber divided by a partition 32 having a valve opening 4'. The diaphragm 34 is in a driving connection with a valve body 35 that controls the valve opening 4' on the downstream side. The body 35 defines throttle passages 36 and a valve plate 37 that seals valve opening 4' on the inflow side in the event of a pipe or hose break. In addition, valve device 1' has a check valve 39 in a return stub 38 of housing 30 on the heat exchanger side.

Diaphragm 34 is tensioned between housing halves 30' and 30" and is guided on the return chamber, as a function of delivery pressure. The diaphragm 34 controls, with the support of a compression spring 40 engaging valve body 35, the valve body 35 with throttle passages 36 formed in its sealing seat 41. When a coolant throughput is reached for a maximum heat transfer in the heat exchanger 42 located downstream, the valve body 35 is actuated as a function of delivery pressure into the closed position with valve opening 4'. The throttle passages 36 provided have a total cross section by which a coolant throughput that essentially corresponds to the maximum heat transfer is maintained.

In addition, the valve device 1' is designed such that when a pipe or hose break occurs as shown in FIG. 7 for heat exchanger feed 43, with check valve 39 closed in return 38, the valve plate 37 located on a valve shaft 44 of valve body 35 is actuated by a closing spring 45 acting on the return chamber side on diaphragm 34 against the compression spring 40 on the valve body side into the closed position of the valve opening 4'.

A pipe break valve for an oil cooler with two valve elements located a fixed distance apart on a guide sleeve is known from U.S. Pat. No. 2,509,504, with the adjusting movements of the valve elements being triggered hydraulically by a rod-shaped pusher actuated by diaphragms subjected to pressure, with the guide sleeve with the valve elements being displaceably mounted on the pusher. However, the valve device according to the invention 1' is made much simpler with an arrangement that actuates the valve elements 35 and 37 located a fixed distance apart directly by valve shaft 44.

In a third valve device 1" shown in FIG. 8 which is advantageously simple in design, the device is located in a return line 46 of a bypass 49 connected with the cooling circuit 47 of an engine 48. This valve device 1" comprises a valve body 50 slidably arranged in housing 53. As a function of delivery pressure, the valve body 50 is moved into a position with valve seat 51, allowing controlled flow through throttle passages 52. In the event of a pipe or hose break upstream of valve device 1", a spring moves valve body 50 back into the closed position shown in FIG. 8, in order to serve as a pipe or hose break valve. An additional pipe or hose break valve 55 is located in line 54 of bypass 49 which closes a passage 56 under control as a function of the delivery pressure. In a closed position (not shown), an elastic lip seal 57 and latching tongues 58 engage marginal areas of passage 56 to secure pipe or hose break valve 55 engage. In this design, the spring-loaded valve body 50 itself forms the pipe or hose break valve which in connection with the additional pipe or hose break valve 55 located in line 54, upon damage to line 54 upstream of heat exchanger 42 or damage to the return line 46 downstream of heat exchanger 42, suppresses coolant loss in cooling circuit 47 of engine 48 to the greatest degree possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Valve device for a heat exchanger located in a bypass cooling circuit of an internal combustion engine, comprising:

a housing communicated with the bypass cooling circuit;

a valve seat located in said housing, said valve seat defining a line cross section;

a valve body disposed in said housing to be movable between a closed position engaged with said valve seat and an open position spaced from said valve seat, said valve body defining a throttle passage;

a return spring arranged to bias said valve body toward said open position;

said valve body being moved into said closed position by a delivery pressure of a coolant flow for a maximum heat transfer in the heat exchanger, said throttle passage having a cross-section adapted to said maximum heat transfer, wherein said valve body, in the event of a break in the bypass cooling circuit, serves as part of a break valve that is held in a closed position independently of the delivery pressure via a locking device or a closing spring, with a sealing element that suppresses the coolant flow.

2. Valve device according to claim 1, wherein said valve body with said throttle passage is mounted slidably movably in a sliding sleeve that contains said valve seat, said sleeve being movable in said housing with said valve body essentially tightly abutting said valve seat, being brought as a function of the delivery pressure in the event of the break in the bypass cooling circuit against a compression spring with a tight fit with the housing, whereby, with the impact movement of said sliding sleeve, an elastic sealing element in a fixed downstream location in seals said throttle passage.

3. Valve device according to claim 2, wherein said break valve is held in said closed position independently of the delivery pressure via said locking device, said locking device engaging to hold the valve body and the sliding sleeve in a tight, closed position when said throttle passage is closed.

4. Valve device according to claim 3, wherein said valve body has a sealing body with a sealing seat, said sealing body being conical on an inflow side and being slidably guided in said sliding sleeve via wings distributed thereon, and wherein said throttle passage is located in a projection of said valve body located on an outflow side and projecting beyond said valve seat in said closed position of the valve body and the sliding sleeve, said projection including latching portions for receiving latching tongues of said locking device.

5. Valve device according to claim 3, wherein said valve body has a sealing body with a sealing seat, said sealing body being conical on an inflow side and being slidably guided in said sliding sleeve via wings distributed thereon, and wherein said throttle passage is located in a projection of said valve body located on an outflow side and projecting beyond said valve seat in said closed position of the valve body and the sliding sleeve, elastic latching loops mounted on said valve body cooperating with a supporting plate supporting said sealing element for locking.

6. Valve device according to claim 3, wherein said valve body comprises a pot-shaped sealing body on an inflow side and is slidably guided in said sliding sleeve via wings distributed thereon, a bottom of said sealing body defining said throttle passage, a plate arranged downstream of said sealing body supporting said sealing element and a sealing ring impacted by said sliding sleeve, said plate defining openings to allow latching hooks mounted on said valve body to pass through.

7. Valve device according to claim 1, wherein a check valve is located in a bypass return from the heat exchanger as said break valve.

8. Valve device according to claim 1, wherein a diaphragm is arranged in said housing separating a return chamber from a feed chamber, said feed chamber being divided by a partition defining a valve opening, a valve body controlling said valve opening on the downstream side in a driving connection with said throttle passage and a valve plate that closes said valve opening in the event of a pipe or hose break on the inflow side, and in that a check valve is located in a return stub on the heat exchanger side of housing.

9. Valve device according to claim 8, wherein the diaphragm is tensioned between parts of said housing and is guided on the return chamber side, as a function of the delivery pressure, with the support of a compression spring engaging the valve body, said diaphragm controlling said valve body with said throttle passages formed in sealing seat, wherein in the event of a break in the bypass cooling circuit, said check valve closes and the valve plate located on a valve shaft of valve body is actuated into the closed position of valve opening by a compression spring acting on the return chamber side on the diaphragm against the compression spring on the valve body side.

10. Valve device according to claim 1, wherein, in a return of a bypass, connected with a cooling circuit of an engine, a valve device is provided with a valve body firstly as a function of delivery pressure in the closed position with valve seat actuates throttle passages under control and which, in the event of a pipe or hose break upstream of valve device, under the control of spring force, is brought into a closed position that serves as the break valve and cooperates tightly with the housing, with an additional pipe or hose break valve located in supply line of the bypass closing a through flow under control as a function of delivery pressure via an elastic lip seal in the marginal area of through flow into which latching tongues that secure the break valve engage.

11. A valve for a fluid line, comprising:

a valve housing;

a sliding sleeve slidably disposed in said housing, said sliding sleeve being slidable between an upstream position and a downstream position, said sliding sleeve defining a valve seat;

a spring arranged between said sliding sleeve and said valve housing, said spring biasing said sliding sleeve toward said upstream position;

a valve body disposed in said sliding sleeve to be movable between an open position and a closed position, said valve body defining a sealing seat which engages said valve seat in said closed position, said valve body defining a throttle passage;

a return spring arranged between said valve body and said sliding sleeve, said return spring biasing said valve body toward said open position;

a sealing element arranged downstream of said valve body, said sealing element sealing said throttle passage when said valve body is in said closed position and said sliding sleeve is in said downstream position.

12. A valve according to claim 11, further comprising a locking device which locks said valve body in said closed position and said sliding sleeve in said downstream position.

13. A valve according to claim 11, wherein said valve body is responsive to a fluid pressure in said fluid line to move said valve body from said open position to said closed position.

14. A valve according to claim 11, wherein said sliding sleeve is responsive to a fluid pressure loss in said fluid line downstream of said valve to move said sliding sleeve from said upstream position to said downstream position.

15. Valve device according to claim 1, wherein said break valve is held in said closed position independently of the delivery pressure via said locking device.

16. Valve device according to claim 1, wherein said break valve is held in said closed position independently of the delivery pressure via said closing spring.

* * * * *